United States Patent [19]

Anderson

[11] Patent Number: 4,522,128
[45] Date of Patent: Jun. 11, 1985

[54] SWITCH MECHANISM

[75] Inventor: J. Edward Anderson, Minneapolis, Minn.

[73] Assignee: Regents of the University of Minnesota, Minneapolis, Minn.

[21] Appl. No.: 456,860

[22] Filed: Jan. 10, 1983

[51] Int. Cl.³ .............................................. E01B 25/12
[52] U.S. Cl. ................................................... 104/130
[58] Field of Search ............... 104/96, 105, 130, 130.1

[56] References Cited

U.S. PATENT DOCUMENTS

| | | | |
|---|---|---|---|
| 3,593,665 | 7/1971 | Marty | 104/130 X |
| 3,593,668 | 7/1971 | Adams | 104/130 |
| 3,628,462 | 12/1971 | Holt | 104/105 |
| 3,643,601 | 2/1972 | Taylor et al. | 104/88 |
| 3,760,739 | 9/1973 | Benner | 104/130 |
| 3,780,666 | 12/1973 | Perrutt | 104/130 |
| 3,782,292 | 1/1974 | Metcalf | 104/130 |
| 3,787,716 | 1/1974 | LaFrance | 318/135 |
| 3,827,370 | 8/1974 | Hill | 104/130.1 |
| 3,830,162 | 8/1974 | Marten | 104/105 |
| 3,831,527 | 8/1974 | Peterson | 104/130 |
| 3,841,225 | 10/1974 | Johnson | 104/130 |
| 3,845,719 | 11/1974 | Langdon | 104/130 |
| 3,872,793 | 3/1975 | Patin | 104/130 |
| 3,874,299 | 4/1975 | Silva et al. | 104/130 |
| 3,883,098 | 5/1975 | Hermann et al. | 246/167 R |
| 3,891,168 | 6/1975 | Kraus | 246/167 R |
| 3,913,491 | 10/1975 | Auer, Jr. et al. | 104/130 |
| 3,913,712 | 10/1975 | Becker et al. | 141/32 |
| 3,971,459 | 7/1976 | Becker et al. | 191/30 |
| 4,000,700 | 1/1977 | Hannover et al. | 104/130 |
| 4,132,174 | 1/1979 | Miller et al. | 104/130 |
| 4,152,992 | 5/1979 | MacKintosh | 104/130 |
| 4,214,535 | 1/1980 | Gerhard | 104/91 |
| 4,221,171 | 9/1980 | Flaig et al. | 104/130 |
| 4,290,367 | 9/1981 | Brause et al. | 104/105 |

FOREIGN PATENT DOCUMENTS

| | | | |
|---|---|---|---|
| 2429887 | 6/1974 | Fed. Rep. of Germany . | |
| 2363101 | 6/1975 | Fed. Rep. of Germany | 104/130 |
| 2825016 | 12/1979 | Fed. Rep. of Germany | 104/130 |
| 1493577 | 11/1977 | United Kingdom | 104/130 |

OTHER PUBLICATIONS

Pages 61, 63 and 69 from Personal Rapid Transit III, published by the University of Minnesota, Minneapolis, Minnesota, Jun. 1976.

Primary Examiner—Randolph Reese
Attorney, Agent, or Firm—Merchant, Gould, Smith, Edell, Welter & Schmidt

[57] ABSTRACT

A switching mechanism for use in a transit system employing vehicles (10) traveling on a guideway (12), the switching mechanism includes forward and rearward switching subassemblies each having upper (32) and lower (36) switch arms. The upper switch arms include switching wheels (34) which selectively engage switch channels (42) positioned on opposite sides of the guideway to cause the vehicle to follow a selected path on the guideway (12).

6 Claims, 9 Drawing Figures

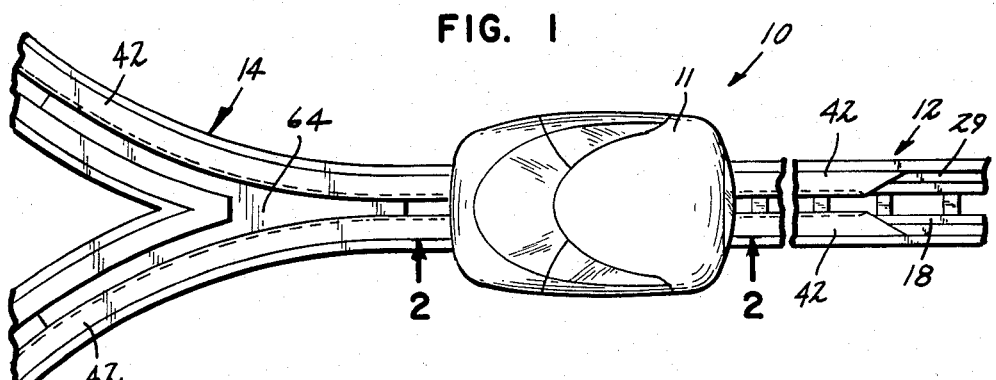
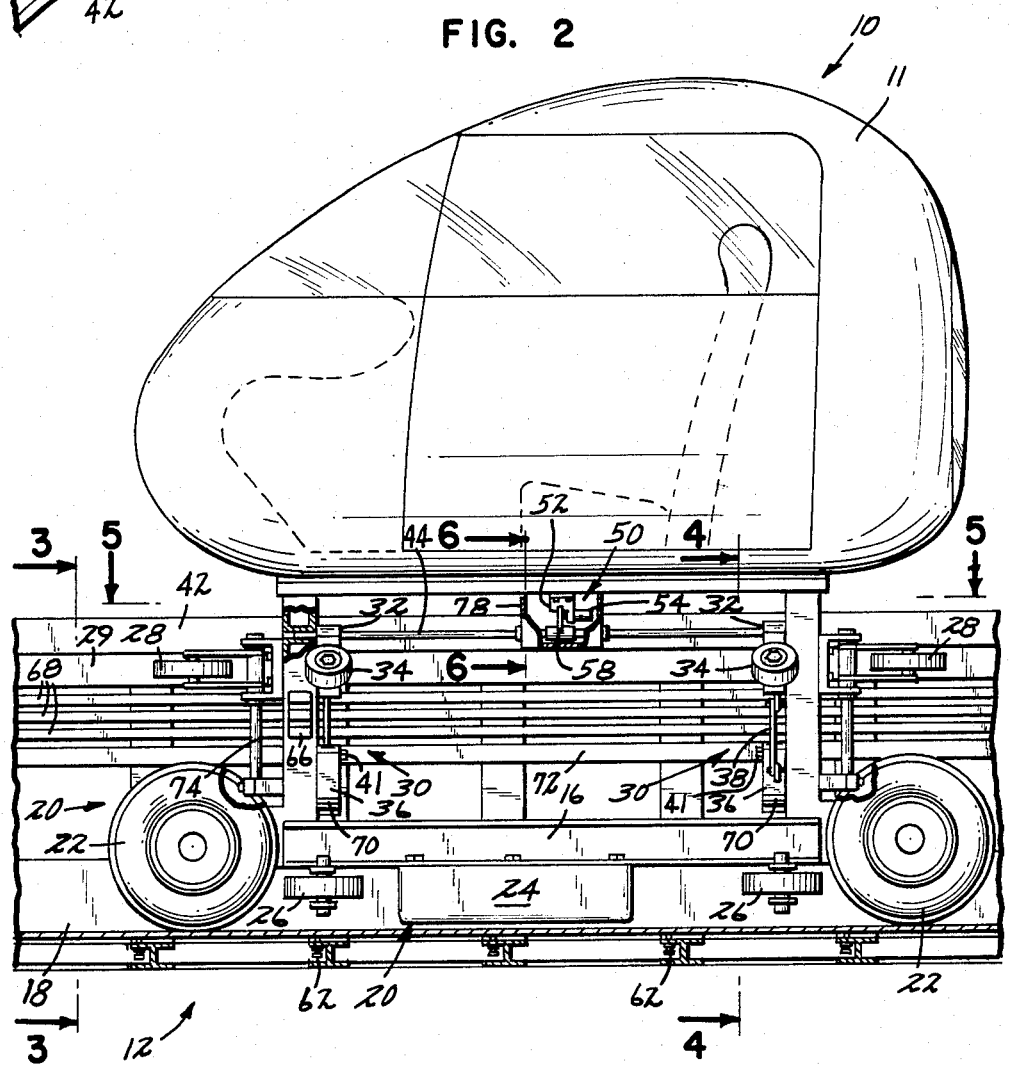

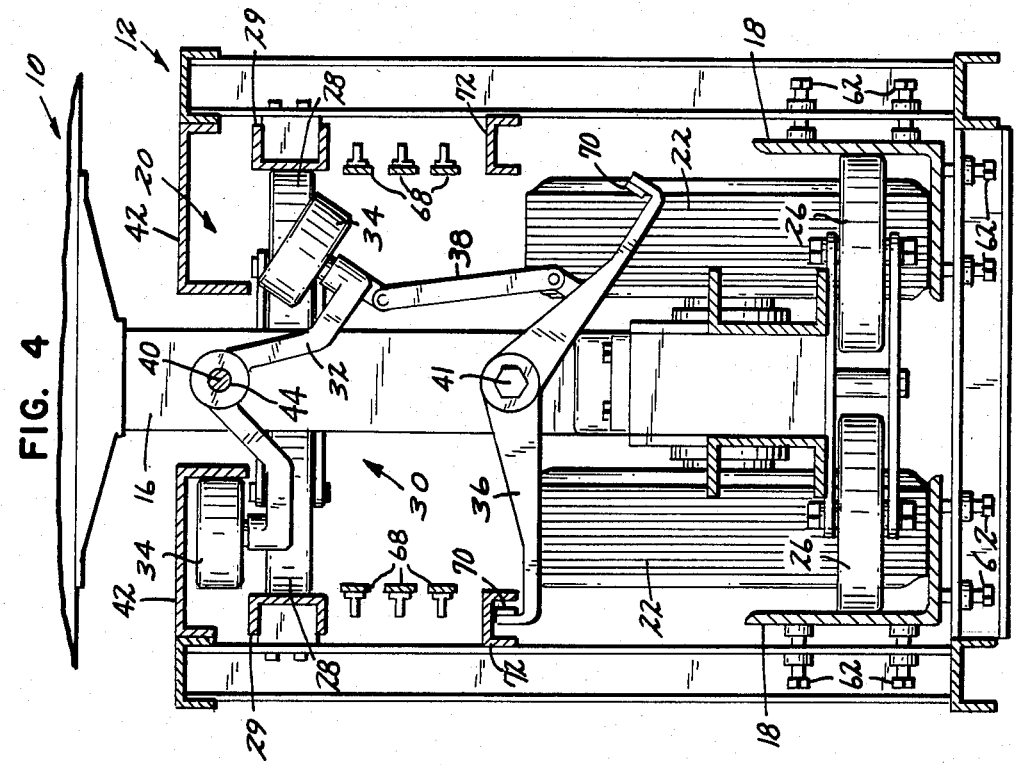

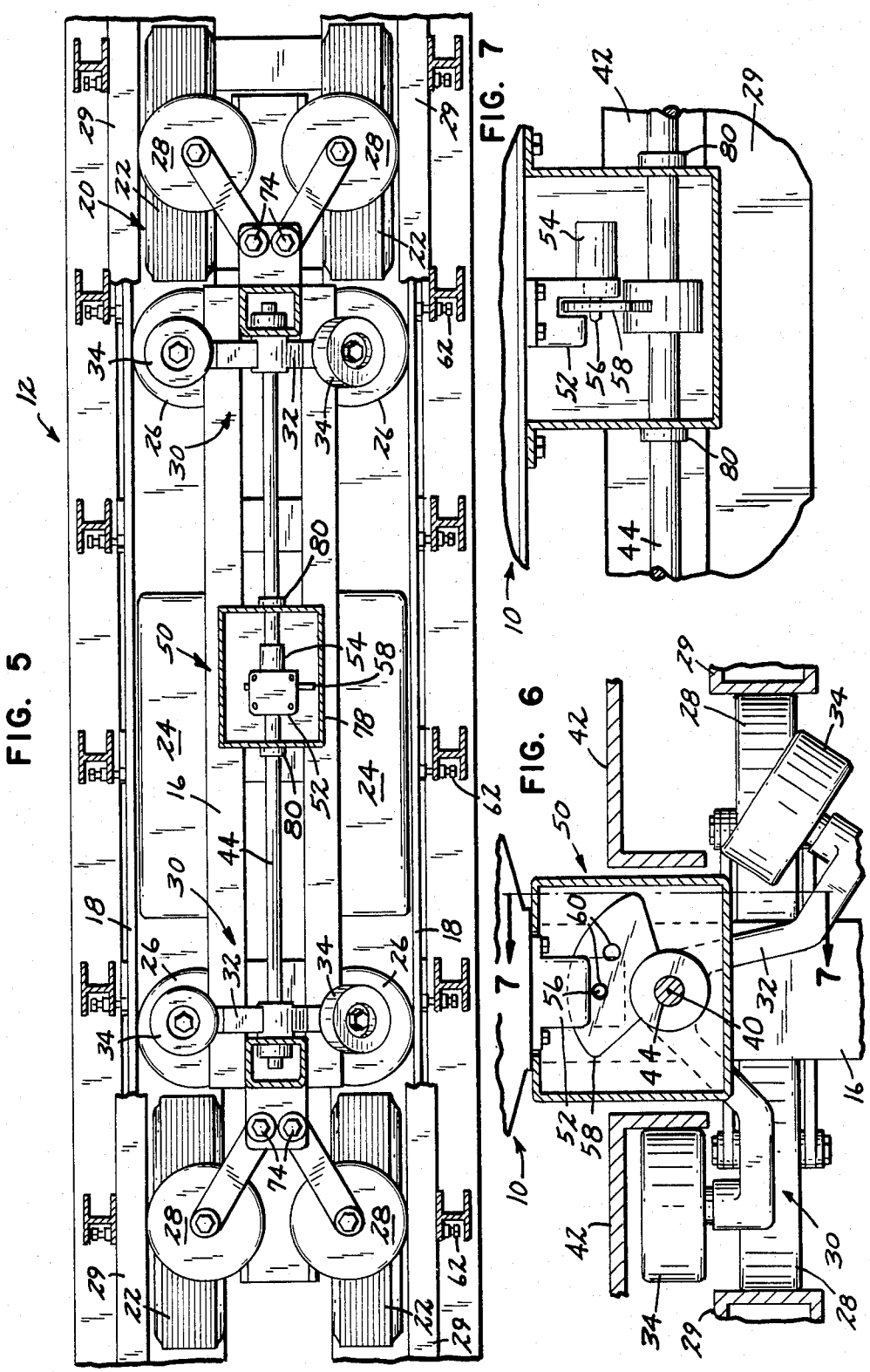

SWITCH MECHANISM

TECHNICAL FIELD

This invention relates generally to self-propelled vehicles traveling on tracks, and more particularly to a switching mechanism for use on a transit system having a car supported by a guideway, wherein selection of the car's path at switching sections of the guideway is determined without any moving parts within the guideway itself.

BACKGROUND OF THE INVENTION

Many persons have endeavored to design alternative systems of public and private transportation. Examples of systems illustrative of the prior work done in this field would include the system engineered by the Aerospace Corporation in Los Angeles, Calif., the Cabintaxi PRT, the Monocab, and the H-Bahn systems. Although each of the above-described systems has evidenced development of the theory of personal rapid transit, each has exhibited shortcomings in simplicity of operation, lightness of overall weight, economy of manufacture, and reliability and safety of operation.

The determination of a vehicle's direction while moving along a stationary track can be solved in many ways. The conventional passenger and freight railroad in use at the present time employs parallel track rails which are themselves moved into position to allow a railway train to be guided onto the proper track. These moving track systems are plagued by numerous problems which find their root in the fact that the track rails themselves must be movable. Consequently, snow, ice, and debris hinder the movement of the tracks and decrease the overall efficiency of the system.

It is known that a monorail system can be designed which allows passage of vehicles through diverging and converging portions of the track without moving parts or switches on the track, rail or guideway itself. Many systems are known which accomplish this result, but all of the known systems are hampered by problems. For example, in a system employing hanging vehicles beneath an overhead rail, the following disadvantages are present regardless of the switching mechanism employed: (1) The guideway must be substantially higher than with a system including vehicles supported above a track, and support posts must be cantilevered to allow room for the car to pass by the post. (2) If the bogie that supports the vehicle is contained within the guideway, a means must be provided to allow the support wheels to pass over the slot through which the vehicle is hung in the switch section. This typically requires that the support wheels be relieved of their supporting weight during switching operations. This problem appears to be inherent in this design and is difficult to overcome economically and simply.

Two examples of the switching mechanisms known in hanging systems are interesting. German Offenlegungschrift No. 24 29 887 laid open for public inspection Jan. 8, 1975, shows a switch mechanism having switch wheels on the ends of a rocker arm. The rocker arm includes joints to allow the switch wheels to remain parallel to each other as they selectively engage a flange. The force of engagement of the switch wheels and the flange will not pass through the pivot point on which the rocker arm pivots. This arrangement requires a substantial lock mechanism to prevent the torque on the pivot point created by the engagement of the wheel on the flange from rotating the rocker arm during use. Similarly, U.S. Pat. No. 4,290,367 issued Sept. 22, 1982, illustrates a device which includes a switch mechanism having torque exerted on the rocker arm due to the geometry of the arrangement. Again, the force of interaction of the rollers on the rails will not pass through the pivot point.

Vehicles which are side mounted on a guideway have the advantage that they may be turned around by passing the vehicle around the end of the guideway and in the reverse direction on the opposite side. This is satisfactory for vehicles operating along a single line but switching the cars between lines is difficult and consequently the side mounted design is less than satisfactory for laying out a complete network. Also, supporting the vehicle on the side of a guideway requires that the wheel supports resist both the weight of the vehicle as well as the bending moment of the vehicle. Thus, the tool wheel load is greater than in a top or bottom-mounted configuration, thereby increasing the total road resistance experienced by the wheels.

In a top-mounted vehicle, one in which the passenger or cargo compartment rides above a guideway or the like, the lateral stability of the vehicle is a consideration. Assuring the stability of the vehicle, particularly when switching, while experiencing crosswind conditions or uneven passenger loading, complicates the design and operation of the system. The ideal top-mounted system would include a guideway of minimum size and weight allowing a system of minimum complexity and expense. A reduction in overall size of the guideway allows the system to operate more economically than would a system with a large elevated roadway. However, a guideway narrower than the vehicle it supports increases the lateral stability concerns and intensifies the need for an improved switching mechanism wherein no moving parts are contained within the guideway and the vehicle remains stable during switching.

Ideally, the switch mechanism is contained completely within the bogie of a vehicle. The switch mechanism should positively insure that the vehicle will negotiate any point of convergence or divergence in the guideway safely. The switch mechanism should maintain its position while in the switching section of the guideway without the need for auxiliary devices. Additionally, the switch mechanism should be designed so that at no time can the wheel of the switch mechanism strike the guide channel of the guideway thus presenting the possibility of damage to the switching mechanism or the guideway. The switch mechanism should also be stable, in that it will remain in a given position during operation of the vehicle along the guideway between switching sections or areas of convergence or divergence. The switch mechanism should be designed so that it is positively locked during use and cannot stop at an intermediate position due to a power or motor failure. Further, the time required to throw the switch should be minimized to allow rapid and sure selection of the vehicle path, and to minimize the required distance between switching sections. Additionally, the vehicle should be equipped with a signaling device which positively indicates the position of the switching mechanism.

Advances in the field of mass transit, in the areas of safety, reliability and dependable operation are important as no system can attract ridership if the system has a poor record of past performance. The switching devices presently available have shortcomings in these areas, and therefore there is a need for an improved switching device.

ENVIRONMENT OF THE INVENTION

The vehicle is propelled by a pair of linear induction motors attached to the bogie which rides within the guideway and supports the vehicle above the guideway. The bogie includes four support wheels and eight horizontal guide wheels which contribute to the lateral stability of the vehicle. Selection of a diverging path within the guideway system is accomplished by de-energizing one of the linear induction motors used for locomotion of the vehicle as it enters a switching region. The linear induction motor on each side of the bogie produces an attraction with the guideway about equal to the thrust generated by the motor. Therefore, if one of the linear induction motors is de-energized, the bogie will be attracted to one side of the guideway by the energized motor. In this way track selection is accomplished. However, should a power failure occur, the vehicle could be in an unstable position due to wind forces or unbalanced loads as it passed through the switching sections of the guideway if a mechanical backup were not provided. This instability is caused by the fact that the side walls of the guideway diverge at the switching sections, thus allowing the otherwise unrestrained car to veer from the side of the guideway.

Switching of the vehicle can also be accomplished without de-energizing one of the linear induction motors. By utilizing the switch mechanism described below, the vehicle can be forced to select the desired path with both linear induction motors energized. As the guideway widens at switching sections, the attractions of the linear induction motor with the side of the guideway which is opposite the selected path will decrease. In some systems it may prove beneficial to accomplish switching without de-energizing one of the linear induction motors.

The invention involves an improved switching mechanism for use in transit systems employing vehicles traveling on a guideway. The guideway itself has no moving parts and switching of the vehicle at diverging and converging points of the guideway is accomplished by forcing the vehicle to adhere to one side of the guideway while approaching a point of divergence within the system.

The switching mechanism system includes forward and rearward switching subassemblies each having upper switch arms and lower switch arms. The forward and rearward subassemblies are interconnected by a connecting bar, and the upper and lower arms are interconnected by slave linkages which are located on opposite sides of the switch arms to balance the mechanism. The upper switch arms include switching wheels which selectively engage switch channels positioned on opposite sides of the guideway at the switching sections of the guideway.

In operation, the switching mechanism is pivoted by a controlling motor and locked into position so that the switching wheels on one side of the bogie engage the switching channel on only one side of the guideway at any one time. In this way, a mechanical stabilizing member forces the vehicle to adhere to one side of the guideway as the vehicle passes a switching section in the guideway. The lateral stability of the vehicle is also greatly improved by the switching mechanism, as should a power failure occur, the car is restrained from tipping by the action of the lower switching arms which rotate with and are slaved to the upper switch arms. The lower switch arms will engage a lower channel should the car begin to tip.

SUMMARY OF THE INVENTION

In a transportation system including a guideway having switching sections and including means for selecting a predetermined path for a vehicle at said switching sections within said guideway.

A vehicle including a body portion and a bogie, located beneath the body and including a main frame member or support structure attached thereto; the bogie further includes means for rolling the vehicle along the guideway, and is located substantially within said guideway.

A means for selecting a predetermined path of travel is provided and includes a mechanical switching mechanism having a first elongated upper switch arm attached in a pivoting relationship near the midpoint of the first arm to the mainframe of said bogie. The arm includes first and second switch wheels affixed at the ends of the arm, the switch wheels having intersecting axes of rotation.

The upper switch arm is switchable between a first position and a second position; the first position placing the first switch wheel in engaging relationship with the first switch channel located within said guideway, the second switch wheel located distant from the second switch channel. The second position placing the second switch wheel in engaging relation with the second switch channel and placing said first switch wheel distant from the first switch channel.

The positions of said upper switch arms cause the vehicle to select a desired path within said guideway.

The upper switch arms are designed so that a plane passing through the center of the switch wheels and perpendicular to the traction surface of the switch wheels will pass through the pivot point of the upper arms. Therefore, the switch arms are self-correcting in that the switch wheels cannot exert a twisting torque on the pivot points of switch arms. This result is created by the geometry of the upper and lower switch arm design in that the line of application of force exerted on the switch wheels will be perpendicular to the switch channels and will pass directly through the pivot points of the switch arms. Similar geometry is provided for the lower switch arms so that a force exerted there will pass directly through the pivot point of the lower arm.

BRIEF DESCRIPTION OF THE DRAWINGS

FIG. 1 is a top plan view of a switching section found within a transit system incorporating an embodiment of the present invention;

FIG. 2 is a side elevational view of a vehicle incorporating an embodiment of the present invention taken generally along line 2—2 in FIG. 1;

FIG. 3 is a front view of a portion of the vehicle incorporating an embodiment of the present invention taken generally along line 3—3 in FIG. 2;

FIG. 4 is a front elevational view of a portion of the vehicle incorporating an embodiment of the present invention taken generally along line 4—4 in FIG. 2;

FIG. 5 is a top plan view of a portion of the vehicle incorporating an embodiment of the present invention taken along line 5—5 in FIG. 2;

FIG. 6 is a partial elevational view of a switch mechanism incorporating an embodiment of the present invention taken generally along line 6—6 in FIG. 2;

FIG. 7 is a partial elevational view of the switch mechanism incorporating an embodiment of the present invention taken along line 7—7 in FIG. 6;

DETAILED DESCRIPTION OF THE INVENTION

Figure 8:
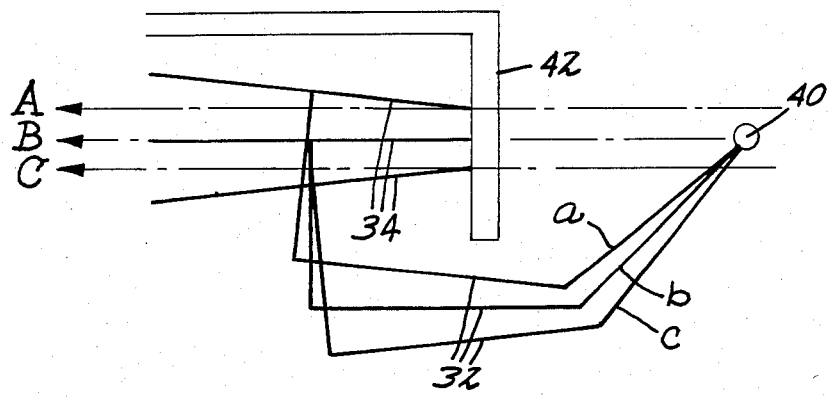
FIG. 8 is a schematic partial view of a switch mechanism incorporating an embodiment of the present invention.

With reference now to the drawings, like reference numerals throughout the several views represent like or corresponding structures. In reference now to FIG. 1, a vehicle 10 is shown above a guideway 12 as the vehicle 10 approaches a switching section 14 within the guideway 12. Switching is accomplished as the vehicle approaches the switching section 14 by causing the vehicle 10 to adhere to one side of the guideway 12, the switching mechanism 30 (described below) serves to ensure the stability of the vehicle 10 as it enters the switching section 14 where the guideway 12 widens.

FIG. 2 illustrates the vehicle 10 having a body portion 11 for containing passengers or cargo, and a bogie portion 20 housed within the U-shaped guideway 12. The bogie 20 includes four support wheels 22 which rest upon the guide channels 18 of the guideway 12. The bogie 20 further includes a support structure or main frame member 16 to which each of the components of the bogie are attached. A pair of linear induction motors 24 are positioned on the main frame 16 of the bogie 20 so that they pass closely by the guide channels 18 of the guideway 12. The linear induction motors 24 provide the thrust which enables the vehicle 10 to move along the guideway 12. (The functioning of the linear induction motors will be described in more detail below.) The bogie 20 includes four lower horizontal guide wheels 26 which roll against the upright portions of the guide channels 18 and increasing the lateral stability of the vehicle 10, and maintain the proper spacing between the linear induction motors 24 and the guide channels 18. (See FIG. 3.) Four upper horizontal guide wheels 28 are also provided on the bogie and provide lateral stability for the upper portion of the bogie 20 within the guideway 12. Electric energy for energizing the linear induction motors 24 is supplied to the vehicle 10 through power rails 68 located along the guideway 12. This power is received by the vehicle 10 through power collectors 66 affixed on either side of the bogie 20 to the main frame 16 and extending outwardly to contact the power rails 68. The upper horizontal guide wheels 28 rest against the upper horizontal guide channel 29 provided along each side of the guideway 12. The upper horizontal guide wheels 28 operate in a spring-type relationship provided by the guide wheel torsion bar 74 affixed in biasing-type relationship to each of the upper horizontal guide wheels 28.

In reference now to FIG. 4, the switch mechanism generally designated 30 is more clearly visible. The switch mechanism is attached in pivotal relationship to the main frame 16 of the bogie 20 at the pivot points 40 and 41. The switch mechanism 30 includes a pair of switch mechanism subassemblies one of which is affixed to the forward end of the main support frame 16 of the bogie 20, and the other of which is affixed to the rearward end of the bogie. The structure of the switch mechanism subassemblies at the forward and rearward locations are similar, only one of which will be described in detail. For example, in reference now to FIG. 4, the rearward subassembly of switch mechanism 30 includes an upper switch arm 32 attached at pivot point 40 to the main frame 16 of the bogie 20. The upper switch arm includes a pair of switch wheels 34 one of which is affixed to each end of the upper switch arm 32. A slave link 38 connects the upper switch arm to a lower switch arm 36. The lower switch arm 36 pivots about a point 41 located on the main frame 16. The upper switch arm 32 and the lower switch arm 36 operate in tandem as they are linked by the slave link 38.

Upper switch arm 32 is conformed so that the force of engagement applied to the upper switch wheels 34 passes directly through the pivot point 40. It should be noted that a force applied by the switch channel 42 will be normal to the switch channel 42 and will therefore pass directly through the pivot point 40 when the axis of rotation of the switch wheel 34 is parallel to the vertical portion of the switch channel 42. With this geometry the upper switch arm 32 will be "self-correcting" and will normally require little or no locking of the switch arm to be effective. Should the switch wheel 34 in contact with the switch channel 42 move upward or downward a small amount from the position shown in FIG. 4, the force on the wheel will no longer be perpendicular to the axis of rotation of the switch wheel 34. Since the force of engagement of the wheel against the switch channel 42 is perpendicular to the switch channel 42, the net force on the switch arm 32 will quickly rotate the switch arm 32 back to the position shown in FIG. 4. This is true regardless of whether the switch arm is moved slightly up or down from the position shown in FIG. 4. This design reduces the need for a switch mechanism lock and greatly enhances the safety and reliability of the switch mechanism as the switch cannot be knocked out of position by the typical forces which act on the vehicle.

Figure 9:
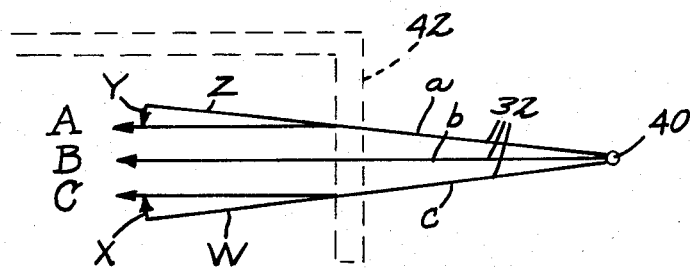
FIG. 9 is a schematic partial view of the operating forces acting on a switch mechanism incorporating an embodiment of the present invention.

In reference to FIGS. 8 and 9, the forces operating on the switch arm 32 can be better understood. FIG. 8 illustrates the switch arm 32 pivoted about the pivot point 40 and shown in three slightly different positions, a, b and c, respectively. The position shown as b indicates the normal operating position of the switch arm 32 with the switch wheel in perpendicular contact with the switch channel 42. The positions shown as a and c illustrate the switch arm being moved slightly upwards or downwards, respectively, from the normal position. The force exerted on the switch arm by the switch channel 42 while in the normal or b position is shown as force B. The force B is perpendicular to the switch channel 42 and lies along a line which passes through the pivot point 40.

When the switch arm 32 is moved slightly upwards, or into the position shown as a, the force exerted on the switch arm by the switch channel 42 acts along the line shown as A. This force is perpendicular to the switch channel 42 but is not perpendicular to the axis of rotation of the switch wheel in its present location. The force vector shown as A, passes above and not through the pivot point 40. Similarly, when the switch arm is below the normal or b position it occupies a position shown as c, the force acting against the switch arm is shown as C. Force vector C passes below the pivot point 40.

In reference now to FIG. 6, the switch arm 32 is shown schematically as a radius having its center at the pivot point 40. The forces A, B and C are shown perpendicular to the switch channel 42 at the points where the radii a, b and c passes switch channel 42, respectively. When the switch arm is in the position illustrated as b, it should be noted that the force vector B passes directly through pivot point 40. In this position, no self-correcting motion is present as the switch arm 32 is in the normal operating position. If the switch arm moves to the position shown as a, the force vector exerted on the arm, shown as A, does not pass directly through the pivot point 40.

Force vector A has two components of force, one acting directly along the radius a, this force is labeled Z; and a second component perpendicular to the radius, this force is labeled Y. Force Y is perpendicular to the radius and in a direction which will cause the switch arm to move toward the normal or b position. Similarly, should the arm be in the position illustrated as c, the force on the arm, C, has a component along the length of the radius, W, and a component perpendicular to the radius, X. Force, X, tends to move the switch arm toward the normal position shown as b. Therefore, the switch arm 32 tends to be "self-correcting" and will generally tend to operate in the position shown as b. Should the switch arm move to a position slightly away from the normal position, the forces acting on the switch arm will tend to return it to the normal position. This represents a significant advance, as it reduces the need for a switch mechanism locking device.

Since a switch mechanism locking device is desirable for safety reasons, to hold the switch arm in position as the vehicle moves between switching sections, the above described switch arm design allows the lock to be of smaller size and less strength than would otherwise be required. Therefore a lock of less overall weight is possible, which lightens the total mass of the vehicle and allows a lock which can be more quickly operated due to its smaller size. Quickness of operation is beneficial to a system of this type as it allows the vehicle to select the desired pathway through a series of switch sections and allows the length of the guideway between switch sections to be reduced.

This design feature for the switch mechanism 30 is accomplished by forming the upper switch arms 32 in a generally "W" shape (see FIGS. 3,4 and 6), with the switch wheels 34 affixed to the ends of the outer legs of the "W" and with the switch arm 32 pivoting about the apex of the central inverted "V" of the "W". It should be noted that the axes of rotation of the switch wheels 34 are not parallel, and intersect at an angle of approximately 34 degrees. This allows the switch wheels 34 to selectively "snap" into position when desired. An acute angle of intersection of the axes of rotation of the switch wheels 34 is desired. Angles in the range of 10 to 60 degrees are expected to function correctly, depending on the geometry of the upper switch arm 32. When engaging the switch channel 42, the axis of rotation of the switch wheel 34 should be parallel to the vertical portion of the switch channel 42.

The generally "W" shape of the upper switch arms 32 allows the wheels to be positioned behind the upright portion of the switch channels 42 while positioning the pivot points 40 to absorb the force of the switch wheels 34 against the switch channels with no torque or twisting force on the pivot points. The "W" shape of the upper switch arms 32 accomplishes this design feature with an arm of the minimum feasible weight.

In reference now to FIG. 6, the upper switch arm 32 of the rear switch arm subassembly is shown on an enlarged scale. The switch wheel 34 affixed to the left-hand side of the upper switch arm 32 has been rotated by the switch throw mechanism so that it contacts the switch channel 42 positioned along the left-hand side of the guideway 12. In this position, the car will adhere to the left-hand side of the guideway 12 and will select the right-hand path at the next point of divergence in the guideway 12. It should be noted that FIG. 6 is taken toward the rear of the car and the left-hand portion of the guideway as seen in FIG. 6 will be the right-hand portion of the guideway when viewed from the perspective of a passenger riding in the vehicle 10 and facing the front.

FIG. 6 illustrates the upper switch arm 32 in position so that one switch wheel 34 is in engaging relation with one of the switch channels 42. The switch wheel 34 at the opposite end of the upper switch arm 32 is away from and not engaging the opposite switch channel 42. The switch mechanism 30 can be rotated about the pivot points 40 and 41 to a second position, placing the opposite switch wheel 34 in engaging relation with the opposite switch channel 42. Only one of the two switch wheels 34 of each subassembly (front and rear) will engage its corresponding switch channel 42 at one time. The opposite switch wheel 34 being located distant from its corresponding switch channel. The two positions of the switch mechanism allow the vehicle 10 to mechanically select the desired path of travel at switching sections 14 located along the guideway 12.

The entire switch mechanism consists of two interconnected upper switch arms 32 each of which has a lower switch arm 36 coupled to it with a slave link 38. The upper switch arms 32 are interconnected by a connecting bar 44. (See FIG. 5.) The connecting bar 44 passes through the pivot points 40 of each upper arm 32. In this way, the front and rear switch arm subassemblies, each comprising an upper switch arm 32 and a lower siwtch arm 36 are coupled to move in unison. The switch mechanism is pendulous in that it will hang freely from its pivot points if allowed to do so, and is balanced having equal mass on each side of the pivot points.

Movement of the switch mechanism between first and second positions is accomplished by the switch throw mechanism 50 which only has to overcome bearing friction as the mechanism is balanced. (See FIGS. 5-7) These positions correspond to vehicle path selection between a left hand and right hand path switching sections of the guideway. The switch throw mechanism 50 includes a switch throw drive 52 which incorporates a linear induction motor interacting with a switch throw plate 58 which is attached in a central location along the connecting bar 44. The switch throw plate 58 is an arcuate plate and is shaped like a portion of a disk. The switch throw plate should be made of an electrically conductive material to properly interact with the linear induction motor which is included in the switch throw drive.

The switch throw plate 58 is provided with two switch locking holes 60 which are positioned so that when the switch mechanism 30 is in either its left-hand or right-hand mode one of the switch locking holes 60 is directly above the pivot point 40. In this position, a switch locking pin is engaged in the switch locking hole 60 by operation of a switch lock solenoid 54. The switch lock pin 56 is inserted into one of the switch locking holes 60 when the switch mechanism 30 is completely positioned in either its left-hand or right-hand mode. The locking pin 56 is removed by the lock solenoid 54 during switching operations. A practical way to insure operation of the switch lock mechanism is to bias the locking pin 56 in the engaged or inserted position, with the lock solenoid 54 overcoming the spring biasing during switching operations.

By placing the switch throw mechanism 50 in a central location along the length of the connecting bar 44, equal operation of both the front and rear switch arm subassemblies is achieved. Other designs for the switch throw mechanism 50 are available, and would include a worm gear driven by a motor, the motor engaging gearing on the outer edge of the switch throw plate 58. Reverse operation of the switch mechanism would be achieved by operating the motor in the opposite direction. (This design is not shown in the drawings.)

The switch throw mechanism 50 is encased in a cover or housing 78 which protects the switch throw mechanism 50 from dust, dirt and the effects of nesting birds or rodents. The cover 78 has journal bearings 80 which seal the opening through which the connecting bar 44 passes. (See FIG. 7.)

OPERATION

In operation, the vehicle 10 is directed through points of divergence within the guideway system by de-energizing one of the linear induction motors 24 carried along the side of the bogie 20. Since each linear induction motor 24 creates a force of attraction to the adjacent portion of the guideway 12 on the order of the thrust generated by the linear induction motor 24, selectively de-energizing one of the linear induction motors 24 creates an unbalanced attraction on the opposite side of the vehicle. This attraction causes the vehicle 10 to adhere to one side of the guideway 12. As the guideway widens at a point of divergence, this attraction serves to keep the vehicle 10 steady as it moves, and causes the vehicle to select one path.

As the vehicle 10 approaches a point of divergence within the system, the switch wheels 34 on the upper switch arms 32 of the switch mechanism 30 will be rotated by the switch throw mechanism 50 to engage the switch channel 42 located along either side of the guideway 12. It should be noted that only one of the switch wheels 34 on the upper switch arm 32 will engage the switch channel 42 on one side of the guideway 12 at any one time. This function is realized as the axes of rotation of the pair of switch wheels attached to each upper arm 32 are not parallel. In this way, by rotation of the switch mechanism about the pivot points 40, the switch wheels positioned on either the left or right side of the bogie 20 will engage the switch channel 42 on either the right or left side of the guideway 12. It is impossible for both the left and the right switch wheels 34 to engage both sides of the switch channel 42 at one time.

The switch mechanism 30 may function as the primary switching device of the vehicle 10, or the safety backup system to the primary track selection function performed by the linear induction motors 24. Should a power failure occur de-energizing both linear induction motors 24 and the car's momentum bring the car to a point of divergence within the guideway 12, the switch mechanism will force the car to adhere to one side of the guideway. Thus, instability is prevented as the sides of the guideway 12 widen at a switch section 14.

At a point of divergence such as switch section 14, within the guideway 12, the guide channels 18 are not independent L-shaped members, each of which supports one of the support wheels 22 as they are at straight away portions of the guideway. At the switch sections 14, the guide channels are interconnected by a guide channel crossover plate 64 (see FIG. 1) so that a single contiguous surface is presented to the support wheels 22. Therefore, as the vehicle 10 proceeds along a diverging or conveying path, each of the support wheels 22 is completely supported by either the guide channel 18 or the crossover plate 64. Therefore, at no time during the switching process is either of the support wheels in an unloaded or unsupported position. This simplifies the switching procedure and the equipment required therefor. The guide channel crossover plate 64 cooperates with the force of adhesion or attraction generated by one of the main linear induction motors 24 and the mechanical attraction function performed by the switch mechanism 30 to ensure that the vehicle 10 is always stable during its motion through the switching section 14.

Further stability is added by the cooperation of the lower switch arms 36 with a pair of catch channels 72 one of which is located along each side of the guideway 12 below the switch channels 42. The catch channels 72 engage the upturned outer ends of each of the lower switch arms 36, and are positioned to engage a pair of rub pads 70 one of which is positioned on each of the inner surfaces of the upturned ends of the lower switch arms 36. The catch channels 72, like the switch channels 42, are only found adjacent to the switching sections 14 of the guideway. They are not found on straight sections of the guideway or where the gauge of the guideway is constant and completely supports the vehicle.

The catch channels 72 prevent the bottom portion of the bogie 20 from moving away from the side of the guideway 12 as the guideway widens near a point of divergence or convergence. Normally, the catch channel 72 will not contact the rub pad 70 affixed to the upturned outer end of the lower arms 36. However, should a power failure occur which decreases the attractive force between the linear induction motors and the main guide channel 18 on the guideway 12, and a crosswind or uneven loading condition move the vehicle 10 to one side of the guideway, the lower switch arm will prevent the bottom portion of the bogie 20 from moving away from the side of the guideway.

The catch channels 72 and the switch channels 42 are positioned within the guideway 12 only near points of convergence or divergence such as switch section 14 within the system. On straight away sections of the guideway 12, the bogie 20 is securely positioned within the guideway 12 by the location of the main guide channels 18, which locate the bogie 20 in cooperation with the upper horizontal guide wheels 28. The main guide channels 18 are adjustable both vertically and horizontally by guide channel adjusters 62. The main guide channels 18 are L-shaped members having upright portions and horizontal portions. Each of the main guide channels 18 runs along the inside lower portion of the guideway 12, and support one pair of the main support wheels 22 (one on the front of the bogie and one on the rear of the bogie 20). The upright portions of the main guide channels 18 contact the lower horizontal guide wheels 26 which serve to position the bogie 20 within the guideway 12 and maintain the proper spacing between the guide channels 18 and the linear induction motors 24.

As the vehicle 10 approaches a point of divergence within the guideway 12, the switch mechanism 30 will be positioned for selecting the desired path along the guideway 12. The figures shown illustrate the switch mechanism 30 in the position required for the vehicle to select the right-hand path shown in FIG. 1. As the vehicle 10 approaches the point of divergence within the guideway 12, the vehicle passes between the switch channels 42 which begin a short distance before the actual point of divergence. (See FIG. 1.) Rotation of the switch mechanism 30 into position brings each of the upper switch arms 32 and the lower switch arms 36 into the proper location with respect to the switch channels 42 and the catch channels 72 located on either side of the guideway 12. In this way the stability of the vehicle 10 is ensured as the guideway widens at the point of divergence. To negotiate a right turn, as seen from the perspective of a rider within vehicle 10, the switch mechanism 30 is positioned as shown in FIGS. 3 and 4. As the vehicle 10 gets nearer the point of divergence, the linear induction motor shown on the right side of FIG. 3 may be de-energized, causing the bogie 20 to adhere to the guide channel 18 shown on the left side of FIG. 3. This causes the vehicle 10 to select the right fork at the point of divergence. It should be remembered that FIG. 3 is shown facing the rear of the car, therefore what appears on the left side of the figure represents the right side of the vehicle when viewed from the perspective of the rider.

The vehicle passes points of convergence in a similar manner. Prior to the point at which the guideway widens and two pathways are combined, the switch mechanism 30 is positioned to cause the vehicle 10 to adhere to the side of the guideway should a power failure occur. The main support wheels 22 are supported by the guide channel crossover plate 64 until the guideway 12 narrows and each main support wheel 22 is again supported by a single main guide channel 18.

In the unlikely event that a total power failure occurs, the vehicle can be propelled by an onboard auxilliary battery which will drive the vehicle at slow speed to the next station or stop point. (Battery not shown in the drawings.) Power could also be supplied by emergency generators (not shown) located at stop points. The vehicle also may be equipped with an emergency brake (not shown) which can stop the vehicle in an emergency, as in the event of a failure of the "regenerative" braking action of the linear induction motors.

A number of characteristics and advantages of the invention have been set forth together with the structure and operation of the preferred embodiment of the switch mechanism. The novel features thereof are pointed out in the following claims. The above disclosure is merely illustrative, and changes may be made in detail with respect to shape, size and structural arrangement within the principles of the invention to the full extent intended by the broad general meaning of the terms expressed in the claims.

What is claimed is:

1. A vehicle mounted switch mechanism for use in a transportation system having a wheeled vehicle having an attached support structure, said system having a fixed guideway with diverging switching sections, the switch mechanism comprising:

a first elongated upper switch arm attached in a pivoting relationship to said support structure and having first and second switch wheels rotatably affixed at the ends of said first switch arm, said first and second switch wheels having intersecting axes of rotation, said axes intersecting at an angle of between 10 and 60 degrees;

said first upper switch arm switchable between a first position and a second position; said first position placing said first switch wheel in engaging relation with a first switch channel located within said guideway and said second switch wheel distant from a second switch channel located within said guideway; said second position placing said second switch wheel in engaging relation with said second switch channel and said first switch wheel distant from said first switch channel;

said first position of said upper switch arm causing said vehicle to select a first path at said switching sections within said guideway, and said second position of said upper switch arm causing said vehicle to select a second path at said switching sections, said first upper switch arm having a generally "W" shape, having outer legs with ends and a central inverted "V" portion, said switch wheels affixed to said ends of said outer legs of said "W";

said first arm being attached at the apex of said inverted "V" portion, to said support structure so that a line passing from the point of engagement of said switch wheel with said switch channel through said apex will pass substantially perpendicularly through said switch channel; and a first elongated lower switch arm affixed in pivoting relation near the midpoint of said first lower switch arm to said support structure below said first upper switch arm, and coupled to said first upper switch by a first slave link affixed to both said first upper and said first lower switch arms.

2. The switch mechanism of claim 1 wherein said means for selecting further comprises:

a second elongated upper switch arm attached in pivoting relation near the midpoint of said second arm to said frame, and having third and fourth switch wheels affixed at the ends of said second switch arm, said third and fourth switch wheels have intersecting axes of rotation; and means for coupling said first upper switch arm and said second upper switch arm to move in unison, said means for coupling including a connecting bar to which each of said switch arms is connected, and which passes through the said points of attachment of said first and second upper switch arms, said connecting bar being affixed in pivoting relation to said main frame.

3. The switch mechanism of claim 2 wherein said second upper switch arm has a generally "W" shape, having outer legs with ends and a central inverted "V" portion, said wheels affixed to said ends of said outer legs of said "W"; and said second upper switch arm being attached in a pivoting relationship at the apex of said inverted "V" portion to said portion of said bogie so that a line passing from the point of engagement of said switch wheel with said switch channel through said apex will pass substantially perpendicularly through said switch channel.

4. The switch mechanism of claim 2 wherein said means for selecting further comprises a second elongated lower switch arm affixed in pivoting relation near the mid-point of said second lower switch arm to said frame portion below said second upper switch arm, and coupled to said second upper switch by a second slave link affixed to both said second upper and said second lower switch arms.

5. A vehicle mounted switch mechanism for use in a vehicle supported by a guideway having switching sections, said guideway including switch channels affixed to opposite sides of said guideway and running along a portion of said guideway adjacent said switching sections, wherein said switch mechanism includes:

a switch arm having a generally "W" shape, with outer legs with ends and a central inverted "V" portion, said switch arm including rotatably affixed switch wheels attached to said ends of said outer legs of said "W" shaped arm, said arm pivotally affixed to rotate between a first and a second position;

means for rotating said switch arm so that said switch wheels will selectively engage either of said opposite switch channels and said vehicle will travel on a predetermined path through said switch section, said means for rotating said switch arm including a switch throw mechanism having a motor attached to said vehicle and interacting with an arcuate shaped throw plate operatively affixed to said switch arm;

means for selectively locking said throw plate and said switch arm in either said first or second positions; said means for locking including a locking pin affixed to said vehicle, said pin selectively operated by a solenoid to engage one of a plurality of locking holes located within said throw plate; and said switch wheels having axes of rotation which intersect each other at an angle between 10 and 60 degrees of arc.

6. The switch mechanism of claim 5 wherein said angle of intersection is substantially equal to 34 degrees.

* * * * *